US008982997B2

(12) United States Patent
Jia et al.

(10) Patent No.: US 8,982,997 B2
(45) Date of Patent: Mar. 17, 2015

(54) SIGNALING AND CHANNEL ESTIMATION FOR UPLINK TRANSMIT DIVERSITY

(75) Inventors: Ming Jia, Ottawa (CA); Masoud Ebrahimi Tazeh Mahalleh, Ottawa (CA); Mohammadhaadi Baligh, Kanata (CA); Hua Xu, Nepean (CA); Jianglei Ma, Kanata (CA); Amir Khandani, Kitchener (CA)

(73) Assignee: Aplle Inc., Cupertino, CA (US)

( * ) Notice: Subject to any disclaimer, the term of this patent is extended or adjusted under 35 U.S.C. 154(b) by 277 days.

(21) Appl. No.: 13/394,888

(22) PCT Filed: Sep. 21, 2010

(86) PCT No.: PCT/CA2010/001509
§ 371 (c)(1),
(2), (4) Date: Aug. 15, 2012

(87) PCT Pub. No.: WO2011/032297
PCT Pub. Date: Mar. 24, 2011

(65) Prior Publication Data
US 2012/0307928 A1 Dec. 6, 2012

Related U.S. Application Data
(60) Provisional application No. 61/244,126, filed on Sep. 21, 2009.

(51) Int. Cl.
H04L 27/00 (2006.01)
H04B 7/06 (2006.01)
H04L 27/26 (2006.01)

(52) U.S. Cl.
CPC ........ H04B 7/0667 (2013.01); H04L 27/2601 (2013.01); H04B 7/0669 (2013.01); H04B 7/0671 (2013.01)
USPC ............. 375/299; 375/295; 341/20; 341/173; 332/106

(58) Field of Classification Search
None
See application file for complete search history.

(56) References Cited

U.S. PATENT DOCUMENTS

2004/0082356 A1 4/2004 Walton et al.
2005/0254596 A1 11/2005 Naguib
(Continued)

FOREIGN PATENT DOCUMENTS

EP 1596520 A2 11/2005
RU 2 321 951 10/2005
(Continued)

OTHER PUBLICATIONS

International Search Report mailed Jan. 6, 2011, in relation to PCT Patent Application No. PCT/CA2010/001509.
(Continued)

Primary Examiner — Shuwang Liu
Assistant Examiner — Gina McKie
(74) Attorney, Agent, or Firm — Fay Kaplun & Marcin, LLP

(57) ABSTRACT

In a method of transmitting a data stream from a transmitter in a multiple-input-multiple-output (MIMO) wireless communication system, where the transmitter comprises a plurality of transmit antennas, a discrete Fourier transform (DFT) is applied to the data stream to generate a plurality of symbol sequences; symbols of a first symbol sequence from the plurality of symbol sequences are paired with symbols of a second symbol sequence from the plurality of symbol sequences to generate a plurality of symbol pairs, wherein the pairing results in an orphan symbol; a space-time block code (STBC) is applied to the symbol pairs to generate a plurality of sets of STBC symbols, each set of STBC symbols being associated with a corresponding one of the plurality of antennas; a cyclic delay diversity (CDD) operation is applied to the orphan symbol to generate a plurality of CDD symbols, each CDD symbol being associated with a corresponding one of the plurality of antennas; and each one of the antennas transmits the corresponding set of STBC symbols and the corresponding CDD symbol.

14 Claims, 9 Drawing Sheets

(56) References Cited

U.S. PATENT DOCUMENTS

| | | | |
|---|---|---|---|
| 2006/0077886 A1* | 4/2006 | Oh et al. | 370/208 |
| 2010/0041350 A1* | 2/2010 | Zhang et al. | 455/101 |
| 2010/0208680 A1 | 8/2010 | Nam et al. | |
| 2011/0143696 A1* | 6/2011 | Luo et al. | 455/101 |

FOREIGN PATENT DOCUMENTS

| | | |
|---|---|---|
| RU | 2 344 555 | 6/2008 |
| WO | 2007/081977 | 7/2007 |
| WO | 2007/095102 | 8/2007 |
| WO | 2009/055208 | 4/2009 |
| WO | 2009066208 A2 | 5/2009 |
| WO | 2010032953 A2 | 3/2010 |

OTHER PUBLICATIONS

Written Opinion mailed Jan. 6, 2011, in relation to PCT Patent Application No. PCT/CA2010/001509.

* cited by examiner

SIGNALING AND CHANNEL ESTIMATION FOR UPLINK TRANSMIT DIVERSITY

RELATED APPLICATIONS

This application claims the benefit of U.S. Provisional Patent Application No. 61/244,126, filed on Sep. 21, 2009, the contents of which are incorporated by reference herein.

FIELD OF THE INVENTION

The present invention relates to wireless communications and more particularly to methods and systems for providing transmit diversity and channel estimation for uplink transmissions.

BACKGROUND

Wireless communication systems are widely deployed to provide various types of communication content such as voice, data, and other content. These systems may be multiple-access systems capable of simultaneously supporting communication for multiple wireless terminals by sharing the available transmission resources (e.g., frequency channel and/or time interval). Since the transmission resources are shared, efficient allocation of the transmission resources is important as it impacts the utilization of the transmission resources and the quality of service perceived by individual terminal users. One such wireless communications system is the Orthogonal Frequency-Division Multiple Access (OFDMA) system in which multiple wireless terminals perform multiple-access using Orthogonal Frequency-Division Multiplexing (OFDM).

OFDM is a multi-carrier modulation technique that partitions the overall system bandwidth into multiple orthogonal frequency subchannels, each of which is associated with a respective subcarrier that may be modulated with data. Because the subchannels are made orthogonal, some spectral overlap between the subchannels is permitted, leading to a high spectral efficiency. In OFDM systems, the user data stream is split into parallel streams of reduced rate, and each obtained substream then modulates a separate subcarrier.

In OFDMA, the transmission resource extends over two dimensions: frequency channels and time intervals. The resources of a given frequency channel may involve contiguous and/or non-contiguous groups of subcarriers.

Examples of OFDM communication systems include, but are not limited to, wireless protocols such as the wireless local area network ("WLAN") protocol defined according to the Institute of Electrical and Electronics Engineering ("IEEE") standards radio 802.11a, b, g, and n (hereinafter "Wi-Fi"), the Wireless MAN/Fixed broadband wireless access ("BWA") standard defined according to IEEE 802.16 (hereinafter "WiMAX"), the mobile broadband 3GPP Long Term Evolution ("LTE") protocol having air interface High Speed OFDM Packet Access ("HSOPA") or Evolved UMTS Terrestrial Radio Access ("E-UTRA"), the 3GPP2 Ultra Mobile Broadband ("UMB") protocol, digital radio systems Digital Audio Broadcasting ("DAB") protocol, Hybrid Digital ("HD") Radio, the terrestrial digital TV system Digital Video Broadcasting-Terrestrial ("DVB-T"), the cellular communication systems Flash-OFDM, etc. Wired protocols using OFDM techniques include Asymmetric Digital Subscriber Line ("ADSL") and Very High Bitrate Digital Subscriber Line ("VDSL") broadband access, Power line communication ("PLC") including Broadband over Power Lines ("BPL"), and Multimedia over Coax Alliance ("MoCA") home networking.

Generally, in OFDMA systems each terminal communicates with one or more base stations via transmissions on the forward and reverse links. The forward link (or downlink (DL)) refers to the communication link from the base stations to the terminals, and the reverse link (or uplink (UL)) refers to the communication link from the terminals to the base stations.

In 3GPP LTE, the following physical channels are defined:

Downlink (DL)

Physical Broadcast Channel (PBCH): This channel carries system information for user equipments (UEs) requiring access to the network.

Physical Downlink Control Channel (PDCCH): The main purpose of this physical channel is to carry scheduling information.

Physical Hybrid ARQ Indicator Channel (PHICH): This channel is used to report the Hybrid ARQ status.

Physical Downlink Shared Channel (PDSCH): This channel is used for unicast and paging functions.

Physical Multicast Channel (PMCH): This physical channel carries system information for multicast purposes.

Physical Control Format Indicator Channel (PCFICH): This channel provides information to enable the UEs to decode the PDSCH.

Uplink (UL)

Physical Uplink Control Channel (PUCCH): This channel is used to transport user signaling data from one or more UE that can transmit on the control channel. The PUCCH transports, for example, acknowledgment responses and retransmission requests, service scheduling requests, and channel quality information measured by the UE to the system.

Physical Uplink Shared Channel (PUSCH): This channel is used to transport user data from one or more mobiles that can transmit on the shared channel.

Physical Random Access Channel (PRACH): This uplink physical channel allows a mobile to randomly transmit access requests when the mobile attempts to access the wireless communication system.

The DL and UL communication links in a wireless multiple-access communication system may be established via one antenna at the transmitter and one antenna at the receiver (single-input-single-output, or SISO), via multiple antennas at the transmitter and one antenna at the receiver (multiple-input-single-output, or MISO), via one antenna at the transmitter and multiple antennas at the receiver (single-input-multiple-output, or SIMO), or via multiple antennas at the transmitter and multiple antennas at the receiver (multiple-input-multiple-output, or MIMO).

A MIMO system may employ transmit diversity to combat the effect of fast fading by using multiple antennas to transmit a data stream via multiple independently fading channels. Transmit diversity schemes can be divided into open loop transmit diversity (OLTD) and closed-loop transmission diversity (CLTD) schemes. In OLTD, no feedback is required from the receiver. In one type of CLTD, a receiver knows an arrangement of transmission antennas, and computes a phase and amplitude adjustment that should be applied at the transmitter antennas in order to maximize a power of the signal received at the receiver. In another type of CLTD, referred to as selection transmit diversity (STD), the receiver provides feedback information to the transmitter regarding which antenna(s) to be used for transmission.

An example OLTD scheme is the Alamouti 2×1 space-time diversity scheme. The Alamouti 2×1 space-time diversity scheme contemplates transmitting a Alamouti 2×2 block code using two transmission antennas using either two time slots (i.e., Space-Time Block Code (STBC) transmit diversity) or two frequency subcarriers (i.e., Space-Frequency Block Code (SFBC) transmit diversity).

A major problem with the multi-carrier modulation in general and OFDM communication systems in particular is the high peak-to-average power ratio (PAPR) that is inherent in the transmitted signal. Large signal peaks occur in the transmitted signal when the signals in the subcarriers add constructively in phase. Such large signal peaks may saturate the power amplifier (PA) at the transmitter and thus, cause non-linear distortion of the transmitted signal, which results in a large degradation of performance, e.g. increase of both the bit error rate (BER) and the out-of-band radiation (spectral spreading). This high PAPR problem may be partially overcome in DL transmission by utilizing more advanced PAs with larger dynamic ranges. However, when it comes to UL transmission, the restrictions of the user equipment (UE), in terms of price and dimensions, precludes the possibility of this solution.

In 3GPP Release 8 E-UTRA, in which only one transmit antenna is supported at the UE, two separate methods have been utilized for PUCCH and PUSCH, respectively, to keep the PAPR as low as possible. In PUCCH, where code-division multiple access (CDMA) is the multiple-access method, orthogonal spreading codes are designed such that they provide a relatively low PAPR at the output of the Inverse Discrete Fourier Transform (IDFT) signal processing step of OFDM. In PUSCH, on the other hand, Single Carrier Frequency-Division Multiple Access (SC-FDMA) has been adopted as the multiple-access scheme to decrease the PAPR as compared with OFDMA. SC-FDMA is a modulation and multiple-access scheme which, due to its inherent single carrier structure, has a lower transmit signal PAPR than OFDMA.

In Advanced E-UTRA, increased peak data rates (e.g. up to 500 Mbps in the UL) are targeted. A promising technique to fulfil these high data rates is MIMO. In cases where MIMO is used, the UE can utilize an OLTD scheme to support the target data rates at acceptable error rates. However, the OLTD schemes currently proposed suffer either from the high PAPR problem described above or from what is known in the art as the orphan symbol problem. For example, STBC preserves the low PAPR property but requires an even number of symbols per slot, whereas SFBC works for any number of symbols but increases the PAPR. Cyclic Delay Diversity (CDD), another candidate transmit diversity scheme, preserves the low PAPR property and works for any number of symbols, but suffers from poorer performance relative to STBC and SFBC.

Another problem that arises due to MIMO relates to UL channel estimation. UL reference signals (RS) in LTE can be classified into three broad types: reference signals for demodulation of PUSCH, reference signals for demodulation of PUCCH, and reference signals for measurement of UL channel quality. Currently, for certain PUCCH formats in LTE, RS symbols are separated from each other within each slot. This RS separation is not beneficial in low SNR, because interpolation accuracy is degraded in low SNR. A straightforward solution is to assign two orthogonal sequences (OS) to each UE so that the channel estimation for each antenna can be performed as in the single antenna case. However, this solution wastes resources (orthogonal sequences) which could otherwise be used to support more UEs. Moreover, this solution entails some signalling overhead to inform the UEs which additional sequence to choose.

A need exists for improved transmit diversity schemes for uplink transmission. A need also exists for improved channel estimation schemes.

SUMMARY OF THE INVENTION

In accordance with an aspect of the present invention, there is provided a method of transmitting a data stream from a transmitter in a multiple-input-multiple-output (MIMO) wireless communication system, where the transmitter comprises a plurality of transmit antennas. According to the method, a discrete Fourier transform (DFT) is applied to the data stream to generate a plurality of symbol sequences; symbols of a first symbol sequence from the plurality of symbol sequences are paired with symbols of a second symbol sequence from the plurality of symbol sequences to generate a plurality of symbol pairs, wherein the pairing results in an orphan symbol; a space-time block code (STBC) is applied to the symbol pairs to generate a plurality of sets of STBC symbols, each set of STBC symbols being associated with a corresponding one of the plurality of antennas; a cyclic delay diversity (CDD) operation is applied to the orphan symbol to generate a plurality of CDD symbols, each CDD symbol being associated with a corresponding one of the plurality of antennas; and each one of the antennas transmits the corresponding set of STBC symbols and the corresponding CDD symbol.

In accordance with a further aspect of the present invention, there is provided a mobile station comprising a controller and a plurality of transmit antennas, the mobile station operable to transmit a data stream in a multiple-input-multiple-output (MIMO) wireless communication system. The controller is operable to: apply a discrete Fourier transform (DFT) to the data stream to generate a plurality of symbol sequences; pair symbols of a first symbol sequence from the plurality of symbol sequences with symbols of a second symbol sequence from the plurality of symbol sequences to generate a plurality of symbol pairs, wherein the pairing results in an orphan symbol; apply a space-time block code (STBC) to the symbol pairs to generate a plurality of sets of STBC symbols, each set of STBC symbols being associated with a corresponding one of the plurality of antennas; apply a cyclic delay diversity (CDD) operation to the orphan symbol to generate a plurality of CDD symbols, each CDD symbol being associated with a corresponding one of the plurality of antennas; and transmit from each one of the antennas the corresponding set of STBC symbols and the corresponding CDD symbol.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate embodiments of the invention by example only.

DETAILED DESCRIPTION

Figure 1:
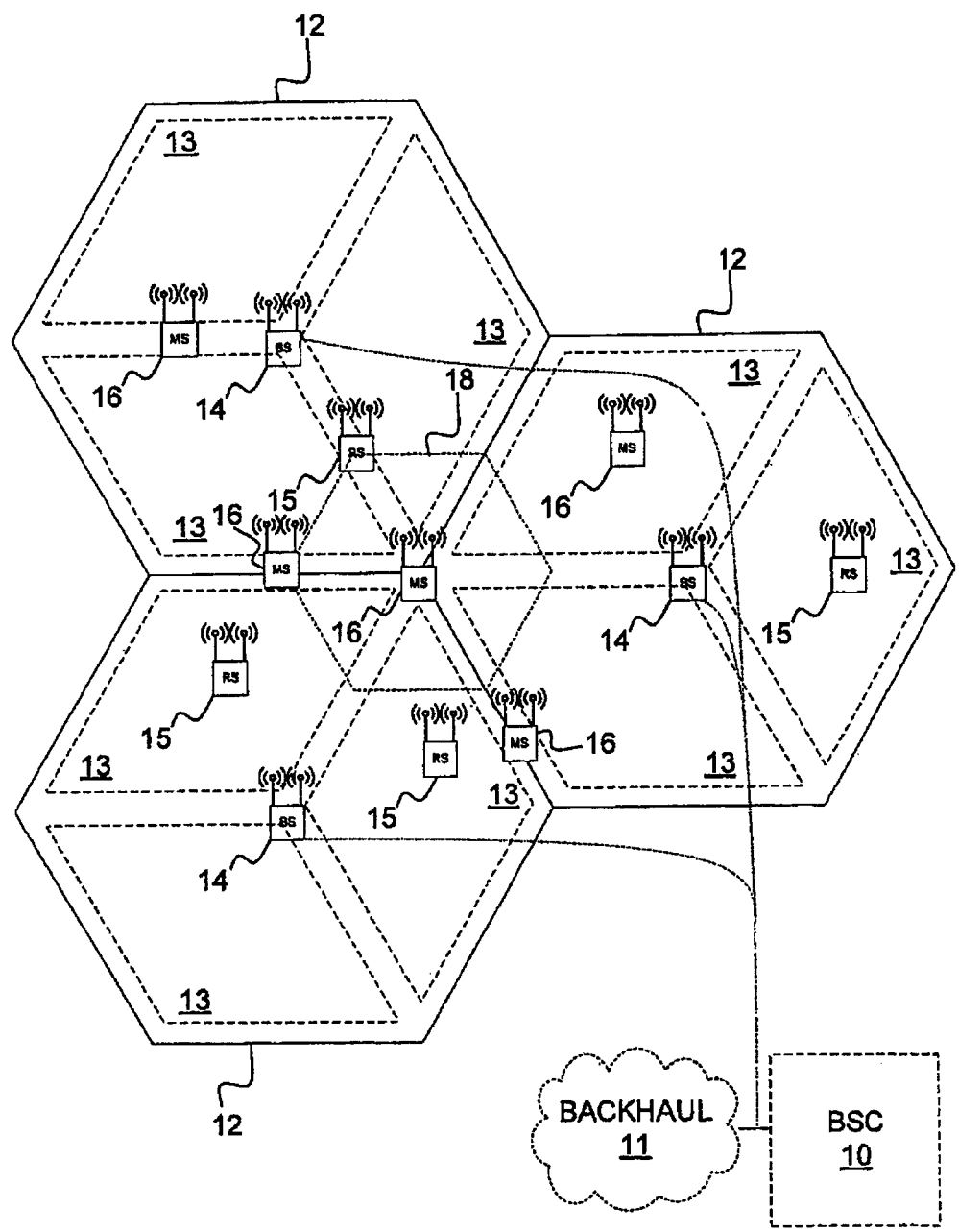
FIG. 1 is a block diagram of a cellular communication system.

Referring now to the drawing figures in which like reference designators refer to like elements, FIG. 1 shows a base station controller (BSC) 10 which controls wireless communications within multiple cells 12, which cells are served by corresponding base stations (BS) 14. In some configurations, each cell is further divided into multiple sectors 13 (not shown). In general, each base station 14 facilitates communications using OFDM with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. As described in more detail below, relay stations 15 may assist in communications between base stations 14 and mobile terminals 16. Mobile terminals 16 can be handed off 18 from any cell 12, sector 13 (not shown), base station 14 or relay 15 to an other cell 12, sector 13 (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
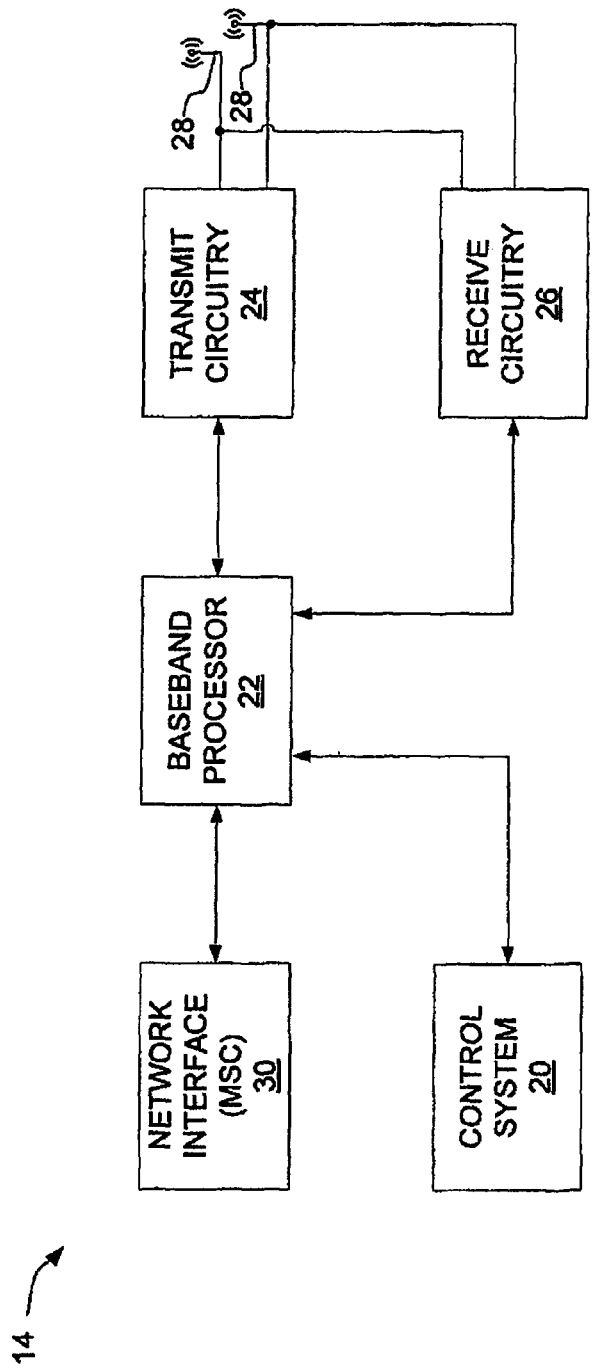
FIG. 2 is a block diagram of an example base station that might be used to implement some embodiments of the present application.

FIG. 2 depicts an example of a base station 14. Base station 14 generally includes a control system 20, a baseband processor 22, transmit circuitry 24, receive circuitry 26, antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
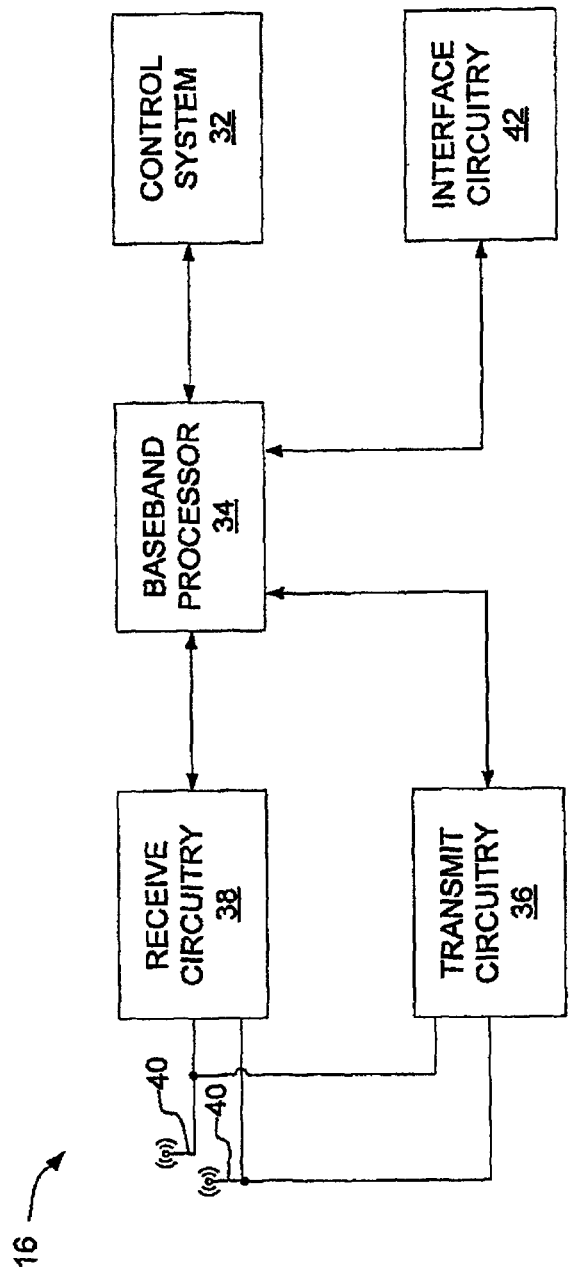
FIG. 3 is a block diagram of an example mobile terminal that might be used to implement some embodiments of the present application.

FIG. 3 illustrates an example of a mobile terminal 16. Similarly to the base station 14, the mobile terminal 16 will include a control system 32, a baseband processor 34, transmit circuitry 36, receive circuitry 38, antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

Baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
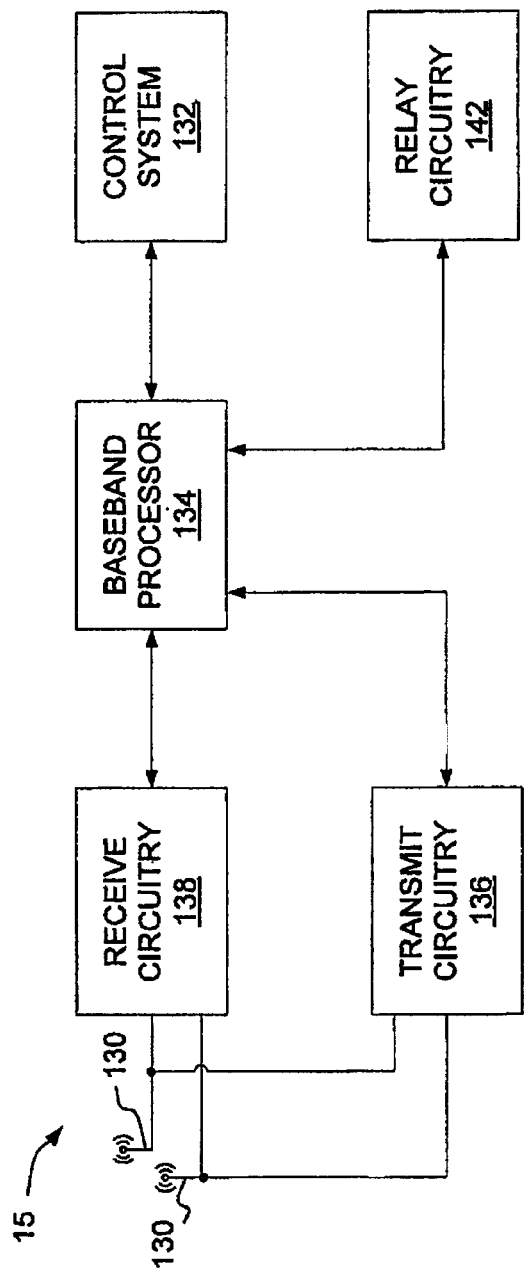
FIG. 4 is a block diagram of an example relay station that might be used to implement some embodiments of the present application.

FIG. 4 illustrates an example relay station 15. Similarly to the base station 14, and the mobile terminal 16, the relay station 15 includes a control system 132, a baseband processor 134, transmit circuitry 136, receive circuitry 138, antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

Baseband processor 134 processes the digitized received signal to extract the information or data bits conveyed in the received signal. This processing typically comprises demodulation, decoding, and error correction operations. Baseband processor 134 is generally implemented in one or more digital signal processors (DSPs) and application specific integrated circuits (ASICs).

For transmission, baseband processor 134 receives digitized data, which may represent voice, video, data, or control information, from control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
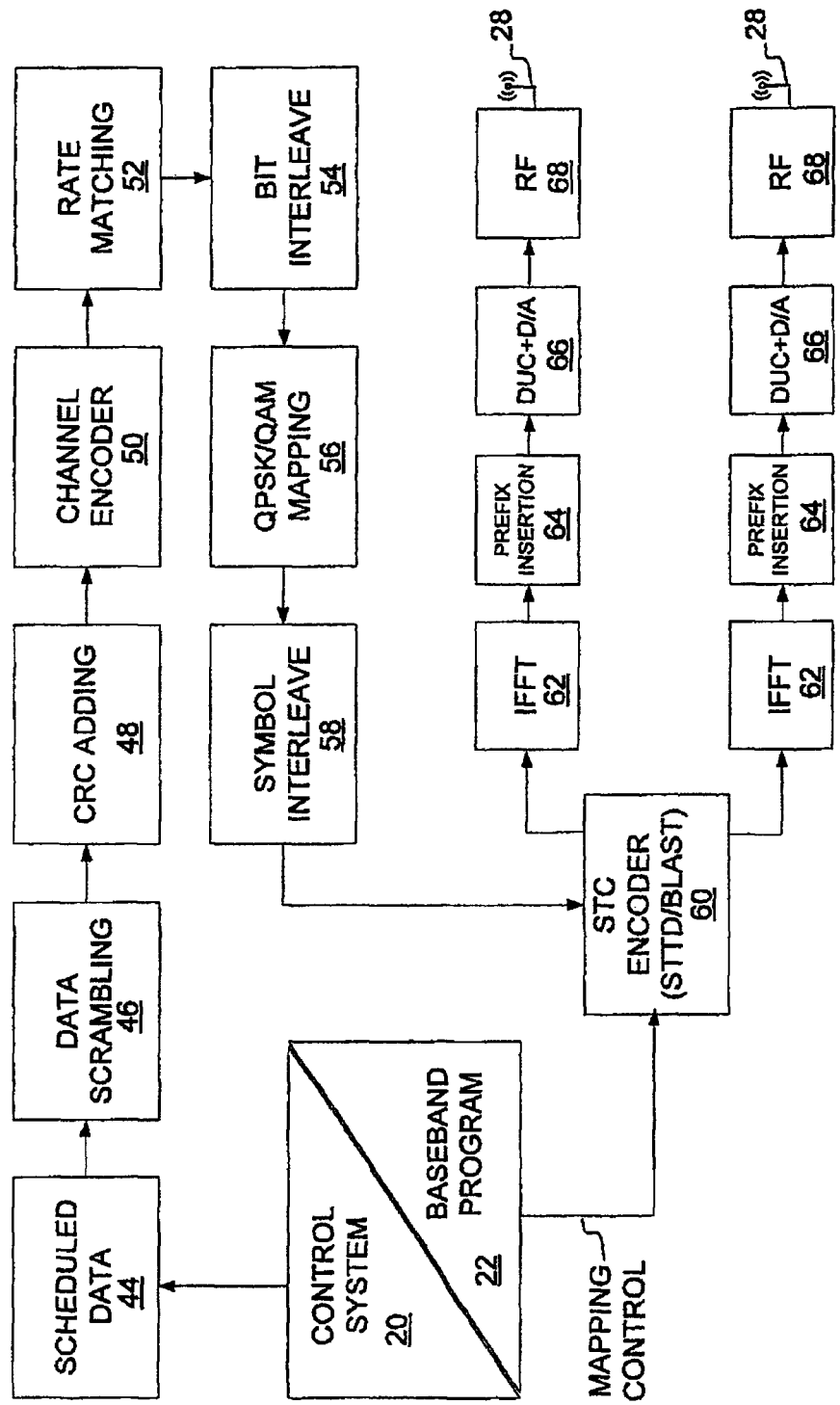
FIG. 5 is a block diagram of a logical breakdown of an example OFDM transmitter architecture that might be used to implement some embodiments of the present application.

With reference to FIG. 5, a logical OFDM transmission architecture will be described. Initially, base station controller 10 will send data to be transmitted to various mobile terminals 16 to base station 14, either directly or with the assistance of a relay station 15. As described in more detail below, base station 14 uses the channel quality indicators (CQI) values associated with the mobile terminals to schedule the data for transmission as well as select an appropriate modulation and coding scheme (MCS) level for transmitting the scheduled data. The CQI values may be received directly from the mobile terminals 16 or determined at the base station 14 based on information provided by the mobile terminals 16. In either case, the CQI value associated with each mobile terminal 16 may for example be a function of the signal-to-interference ratio (SIR), as well as of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. As described in more detail below, the channel coding for a particular mobile terminal 16 is based on the current CQI value associated with that mobile terminal. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. As described in more detail below, the degree of modulation is chosen based on the CQI value for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with reference to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the SIC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the TUFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUG) and digital-to-analog (DIA) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
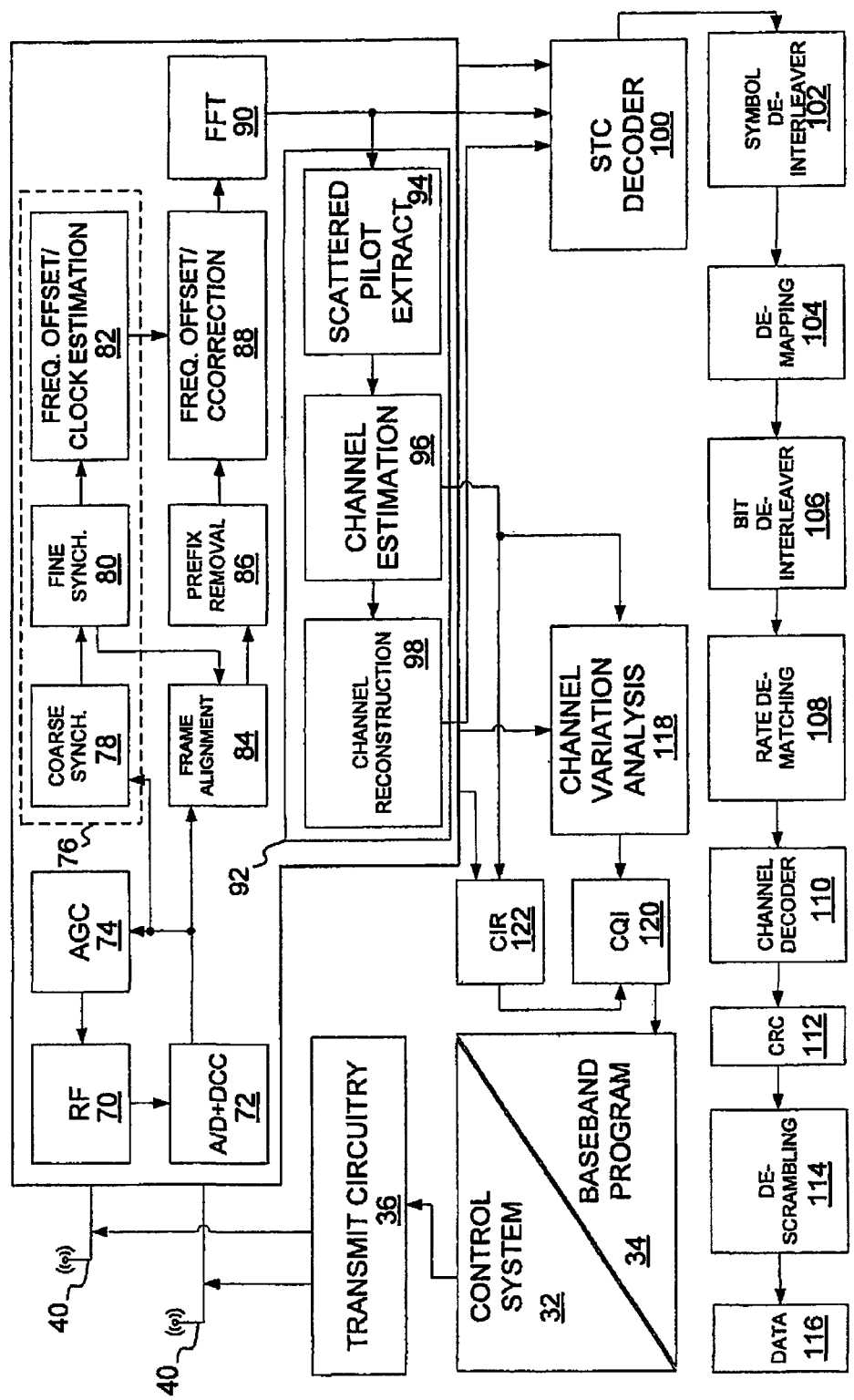
FIG. 6 is a block diagram of a logical breakdown of an example OFDM receiver architecture that might be used to implement some embodiments of the present application.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using EFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to STC decoder 100 sufficient to remove the effects of the transmission channel when processing the respective frequency domain symbols. The relay station could act as another base station or as a terminal in the context of this invention.

The recovered symbols are placed back in order using symbol de-interleaver logic 102, which corresponds to the symbol interleaver logic 58 of the transmitter. The de-interleaved symbols are then demodulated or de-mapped to a corresponding bitstream using dc-mapping logic 104. The bits are then de-interleaved using bit de-interleaver logic 106, which corresponds to the bit interleaver logic 54 of the transmitter architecture. The dc-interleaved bits are then processed by rate dc-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI value, or at least information sufficient to determine a CQI value at the base station 14, is determined and transmitted to the base station 14. As noted above, the CQI value may be a function of the signal-to-interference ratio (SIR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 to 6 provide one specific example of a communication system that could be used to implement embodiments of the application. It is to be understood that embodiments can be implemented with communications systems having architectures that are different than the specific example, but that operate in a manner consistent with the implementation of the embodiments as described herein.

In one embodiment, the communication system of FIGS. 1 to 6 is 3GPP LTE-compliant, and Single Carrier Frequency-Division Multiple Access (SC-FDMA) is utilized as the multiple-access scheme for uplink transmissions from mobile device 16 to either of relay 15 and base station 14.

Figure 7A:
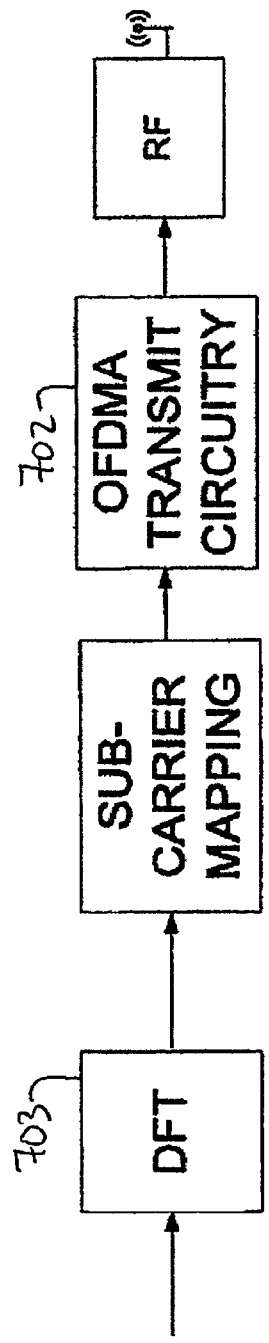
FIG. 7A is an example SC-FDMA transmitter.
Figure 7B:
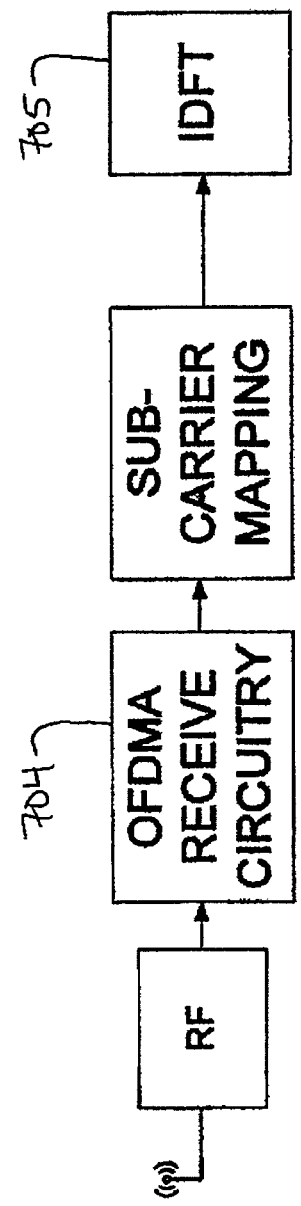
FIG. 7B is an example SC-FDMA receiver.

FIGS. 7A and 7B illustrate the basic signal processing steps needed at the transmitter and receiver, respectively, for a SC-FDMA channel. As shown, SC-FDMA can be viewed as a Discrete Fourier Transform (DFT) pre-coded OFDMA scheme. There are several similarities in the overall transceiver processing of SC-FDMA and OFDMA. Those common aspects between OFDMA and SC-FDMA are depicted generally as OFDMA transmit circuitry 702 and OFDMA receive circuitry 704, as they will be obvious to a person having ordinary skill in the art in view of the present specification. SC-FDMA is distinctly different from OFDMA because of the DFT pre-coding 703 of the modulated symbols, and the corresponding IDFT 705 of the demodulated symbols. Because of this pre-coding, the SC-FDMA subcarriers are not independently modulated as in the case of the OFDMA subcarriers. As a result, the PAPR of the SC-FDMA signal is lower than the PAPR of the OFDMA signal.

In accordance with some embodiments of the present application, Space-Time Block Code (STBC) transmit diversity is utilized as the OLTD scheme by feeding a specific sequence to the STC encoder block 60 of FIG. 5 (e.g. for PUSCH and PUCCH). More specifically, for PUSCH, STBC may be used with symbols paired from two consecutive slots. If the symbols have a low PAPR property, then with STBC, the low PAPR is preserved. If after pairing there exists an unpaired symbol (i.e., an orphan symbol), the orphan symbol may be sent using a Cyclic Delay Diversity (CDD) scheme with a large delay. The delay may be, for example, a quarter of a cycle or three quarters of a cycle. The delay provides implementation simplicity without any performance degradation. Also, the delay makes CDD equivalent to a pre-coded MIMO system by providing frequency diversity if the channel conditions change over time. The codebook may be of size 4 as already adopted for downlink closed loop MIMO systems. This approach is equivalent to a pre-coding matrix hoping (PMH) scheme, where the precoding matrix changes from one entry in the codebook to another.

For PUCCH, STBC may be used with symbols paired from two orthogonal sequences. In PUCCH, the number of symbols in each subframe is even. However, in some cases the number of symbols in each slot is odd. In such cases, the last symbol of slot 0 may be paired with the first symbol of slot 1. Because the two slots are in different frequency bands, a minimum mean square error (MMSE) receiver may be used for these symbols.

Figure 8:
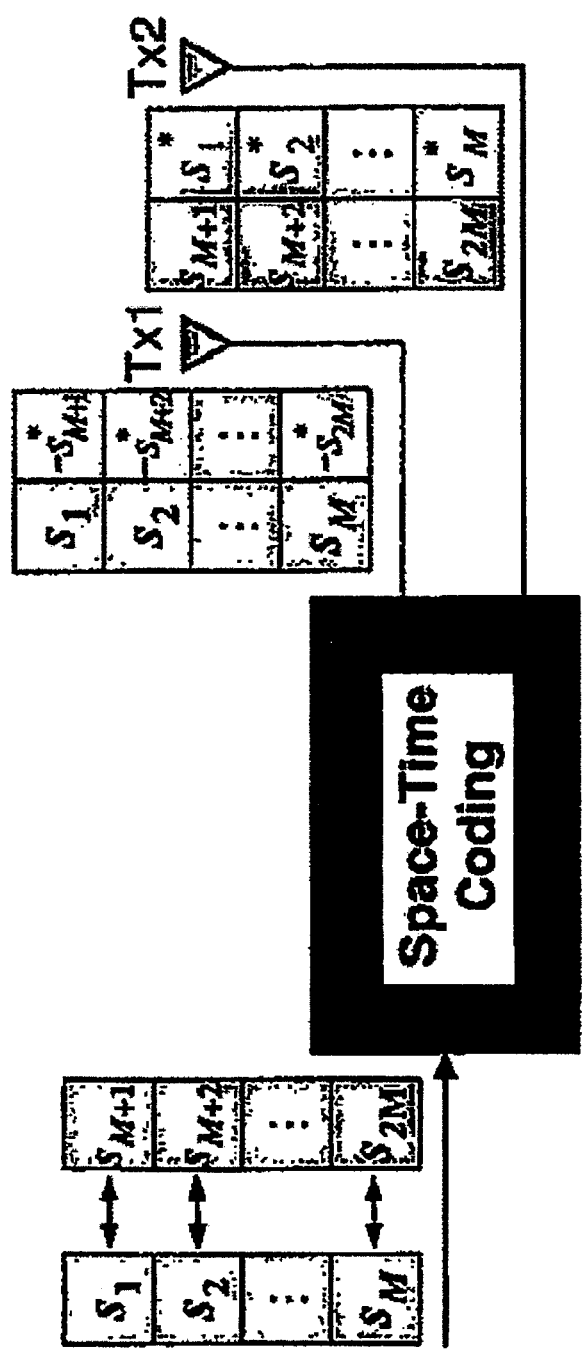
FIG. 8 is an example Space-Time Block Code (STBC) scheme.

FIG. 8 illustrates STBC coding applied to paired symbols from two consecutive low PAPR sequences such that the low PAPR property is preserved. If a pair consisting of two STBC symbols from different slots is transmitted on different frequency bands due to inter-slot hopping, a minimum mean square error (MMSE) receiver may be used. Otherwise, an Alamouti decoder can be used. For example, PUCCH channel formats 2/2a/2b may have an odd number of symbols in each slot while having an even number of symbols in each subframe.

In cases where the number of symbols per subframe is odd, a pairing operation results in an unpaired symbol, also referred to as an orphan symbol. For the orphan symbol, CDD transmit diversity may be used. For example, in PUSCH one symbol of the second slot is dedicated for the sounding reference signal (SRS).

The cyclic shift (CS) of CDD is proposed to be a quarter or three quarters of an OFDM or SC-FDMA symbol (CS=N/4 or CS=3N/4) for low complexity implementation and for better performance. As noted above, with CS=N/4 or CS=3N/4, CDD can be considered equivalent to pre-coding matrix hopping (PMH) in the frequency direction and in the order of:

$$\left\{ \begin{bmatrix} 1 \\ 1 \end{bmatrix}, \begin{bmatrix} 1 \\ -j \end{bmatrix}, \begin{bmatrix} 1 \\ -1 \end{bmatrix}, \begin{bmatrix} 1 \\ j \end{bmatrix} \right\}, \text{ or } \left\{ \begin{bmatrix} 1 \\ 1 \end{bmatrix}, \begin{bmatrix} 1 \\ j \end{bmatrix}, \begin{bmatrix} 1 \\ -1 \end{bmatrix}, \begin{bmatrix} 1 \\ -j \end{bmatrix} \right\}.$$

The above codebooks have been already adopted for downlink closed-loop MIMO. PMH can be implemented with low complexity, and performs as well as (or better than) CDD with other CS values.

For channel estimation in PUCCH when multiple antennas are transmitting simultaneously, a two-level code division multiplexing (CDM) scheme for reference signal (RS) transmission may be used, where the first level separates the UEs (same as supporting only one transmit antenna) and the second level separates the antennas. For example, when there are two transmit antennas and two RSs per slot, the same RS is transmitted from both antennas. However, the block of four RSs (across time and space) is Hadamard coded. Advantageously, only one sequence is assigned to each UE at each time. To improve the performance of this scheme, the RSs may be transmitted in the middle of each slot in order to reduce the effect of intra-code interference.

Figure 9:
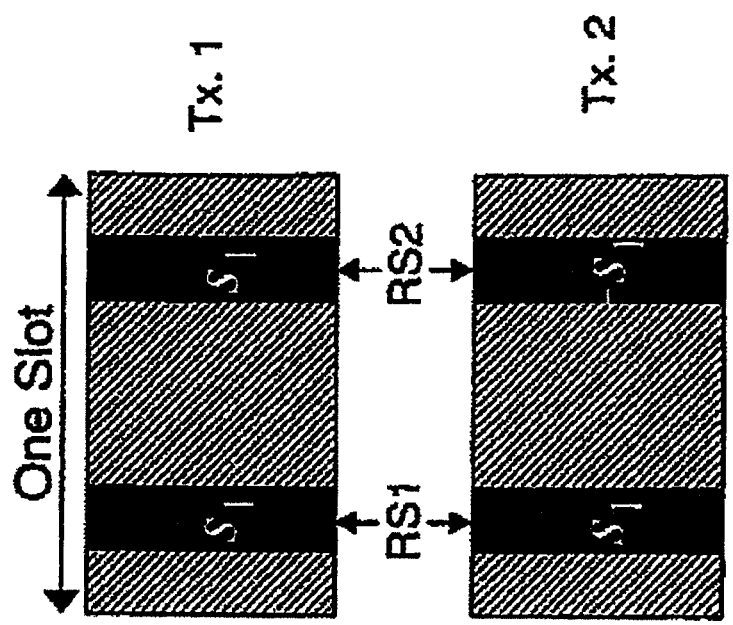
FIG. 9 is an example reference signal arrangement that may be used to support channel estimation.

FIG. 9 shows an example RS arrangement for two RSs in the same slot (e.g. PUCCH with normal cyclic prefix (CP) in LTE for format 2, 2a and 2b). Hadamard coded RSs may be transmitted, with both antennas using the same orthogonal sequence (OS) at a given slot. The RSs are Hadamard coded across time and space within each slot: at RS1, both transmit antennas Tx1 and Tx2 transmit sequence S1; at RS2, transmit antenna Tx1 transmits sequence S1 and transmit antenna Tx2 transmits sequence −S1.

Figure 10:
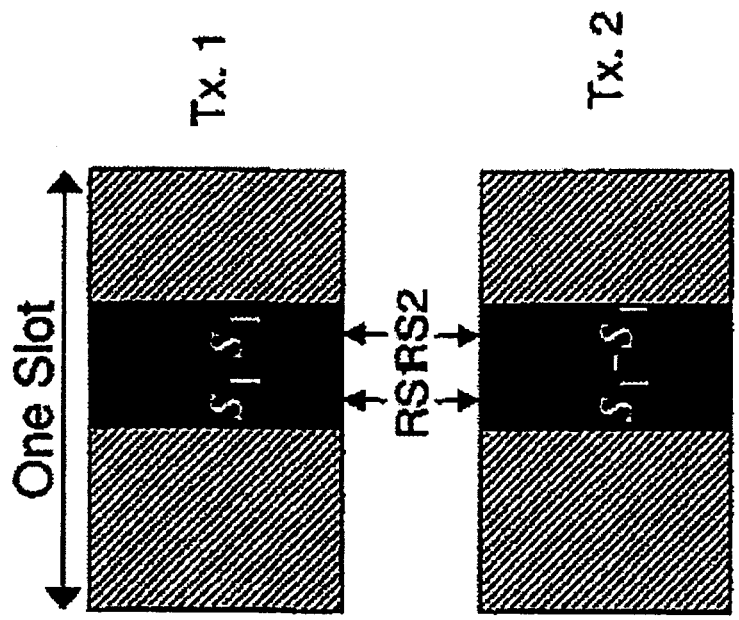
FIG. 10 is another example reference signal arrangement that may be used to support channel estimation.

FIG. 10 shows another example RS arrangement for two RSs in the same slot. As previously noted, for a two-layer CDM RS arrangement the RSs could be put next to each other in the middle of the slot, as shown in FIG. 10. In one embodiment, for PUCCH with normal CP for formats 2/2a/2b, symbols 3 and 4 may be used for RSs in slot 0, and symbols 2 and 3 may be used for RSs in slot 1. It will be appreciated that by using this approach intra-code interference is suppressed, and better performance can be achieved.

Advantageously, the proposed two-level CDM RS transmission enables efficient CDM MIMO channel estimation. The same number of UEs as the single transmit antenna case may be multiplexed and there is no need to change the existing RS sequence assignment scheme. Also, as there is a one-to-one relation between the UL transmission mode (TxD vs. non-TxD) and the RS sequence generation/mapping scheme, there is no need to introduce an additional signalling bit. As already noted, the proposed RS arrangement enables the two-level CDM RS transmission scheme to achieve better performance by suppressing the intra-code interference.

Other modifications will be apparent to those skilled in the art and, therefore, the invention is defined in the claims.

What is claimed is:

1. A method of transmitting a data stream from a transmitter in a multiple-input-multiple-output (MIMO) wireless communication system, said transmitter comprising a plurality of transmit antennas, said method comprising:

applying a discrete Fourier transform (DFT) to said data stream to generate a plurality of symbol sequences; pairing symbols of a first symbol sequence from said plurality of symbol sequences with symbols of a second symbol sequence from said plurality of symbol sequences to generate a plurality of symbol pairs, wherein said pairing results in an orphan symbol;

applying a space-time block code (STBC) to said symbol pairs to generate a plurality of sets of STBC symbols, each set of STBC symbols being associated with a corresponding one of said plurality of antennas;

applying a cyclic delay diversity (CDD) operation to said orphan symbol to generate a plurality of CDD symbols, each CDD symbol being associated with a corresponding one of said plurality of antennas;

transmitting from each one of said antennas said corresponding set of STBC symbols and said corresponding CDD symbol; and transmitting, when said plurality of transmit antennas comprises two transmit antennas, from each one of said two transmit antennas two reference signals per slot, with both of said two antennas using one orthogonal sequence per slot, wherein a first one of said reference signals separates said transmitter, and a second one of said reference signals separates a corresponding one of said two antennas.

2. The method of claim 1, wherein said first symbol sequence is associated with a first slot, and said second symbol sequence is associated with a second slot, said first and second slots being consecutive to one another.

3. The method of claim 1, wherein the cyclic shift (CS) of said CDD operation is one of one quarter of a cycle and three quarters of a cycle.

4. The method of claim 1, wherein said STBC code is an Alamouti code.

5. The method of claim 1, wherein said reference signals are Hadamard coded across time and space within each slot.

6. The method of claim 5, wherein for each of said two antennas said two references signals are transmitted consecutively in the middle of a corresponding slot.

7. The method of claim 5, wherein each of said two antennas uses symbols 3 and 4 of a first slot for said two reference signals, respectively, and uses symbols 2 and 3 of a second slot for said two reference signals, respectively, wherein said first and second slots are consecutive.

8. A mobile station comprising a controller and a plurality of transmit antennas, said mobile station operable to transmit a data stream in a multiple-input-multiple-output (MIMO) wireless communication system, said controller operable to:
apply a discrete Fourier transform (DFT) to said data stream to generate a plurality of symbol sequences;
pair symbols of a first symbol sequence from said plurality of symbol sequences with symbols of a second symbol sequence from said plurality of symbol sequences to generate a plurality of symbol pairs, wherein said pairing results in an orphan symbol;
apply a space-time block code (STBC) to said symbol pairs to generate a plurality of sets of STBC symbols, each set of STBC symbols being associated with a corresponding one of said plurality of antennas;
apply a cyclic delay diversity (CDD) operation to said orphan symbol to generate a plurality of CDD symbols, each CDD symbol being associated with a corresponding one of said plurality of antennas;
transmit from each one of said antennas said corresponding set of STBC symbols and said corresponding CDD symbol; and
transmit, when said plurality of transmit antennas comprises two transmit antennas, from each one of said two transmit antennas two reference signals per slot, with both of said two antennas using one orthogonal sequence per slot, wherein a first one of said reference signals separates said mobile station, and a second one of said reference signals separates a corresponding one of said two antennas.

9. The mobile station of claim 8, wherein said first symbol sequence is associated with a first slot, and said second symbol sequence is associated with a second slot, said first and second slots being consecutive to one another.

10. The mobile station of claim 8, wherein the cyclic shift (CS) of said CDD operation is one of one quarter of a cycle and three quarters of a cycle.

11. The mobile station of claim 8, wherein said STBC code is an Alamouti code.

12. The mobile station of claim 8, wherein said reference signals are Hadamard coded across time and space within each slot.

13. The mobile station of claim 12, wherein each of said two antennas transmits said two references signals consecutively in the middle of a corresponding slot.

14. The method of claim 12, wherein each of said two antennas uses symbols 3 and 4 of a first slot for said two reference signals, respectively, and uses symbols 2 and 3 of a second slot for said two reference signals, respectively, wherein said first and second slots are consecutive.

* * * * *